US011914220B2

(12) United States Patent
Karam

(10) Patent No.: US 11,914,220 B2
(45) Date of Patent: Feb. 27, 2024

(54) LIQUID LENS CONTROL SYSTEMS AND METHODS WITH REDUCED PHASE DELAY

(71) Applicant: CORNING INCORPORATED, Corning, NY (US)

(72) Inventor: Raymond Miller Karam, Santa Barbara, CA (US)

(73) Assignee: CORNING INCORPORATED, Corning, NY (US)

( * ) Notice: Subject to any disclaimer, the term of this patent is extended or adjusted under 35 U.S.C. 154(b) by 660 days.

(21) Appl. No.: 17/054,933

(22) PCT Filed: May 15, 2019

(86) PCT No.: PCT/US2019/032400
§ 371 (c)(1),
(2) Date: Nov. 12, 2020

(87) PCT Pub. No.: WO2019/226433
PCT Pub. Date: Nov. 28, 2019

(65) Prior Publication Data

US 2021/0191069 A1 Jun. 24, 2021

Related U.S. Application Data

(60) Provisional application No. 62/674,530, filed on May 21, 2018.

(51) Int. Cl.

| | |
|---|---|
| ***G02B 27/64*** | (2006.01) |
| ***G02B 7/09*** | (2021.01) |
| ***G02B 3/14*** | (2006.01) |

(52) U.S. Cl.
CPC ................ *G02B 7/09* (2013.01); *G02B 3/14* (2013.01); *G02B 27/646* (2013.01)

(58) Field of Classification Search
CPC .......... G02B 7/09; G02B 3/14; G02B 27/646; G02B 27/64; G02B 1/06; G02B 3/12;
(Continued)

(56) References Cited

U.S. PATENT DOCUMENTS

| | | | | |
|---|---|---|---|---|
| 2010/0177386 A1 | 7/2010 | Berge et al. | | |
| 2011/0115926 A1* | 5/2011 | Mcleod | G03B 5/00 348/208.1 | |
| 2020/0096679 A1* | 3/2020 | Kaminski | G02B 27/646 | |

FOREIGN PATENT DOCUMENTS

| | | |
|---|---|---|
| CN | 1815875 A | 8/2006 |
| CN | 101630107 A | 1/2010 |

(Continued)

OTHER PUBLICATIONS

Chinese Patent Application No. 201910425380.6, Office Action, dated Jun. 6, 2022, 4 pages, Chinese Patent Office.

(Continued)

*Primary Examiner* — Arnel C Lavarias
(74) *Attorney, Agent, or Firm* — Tamika A. Crawl-Bey

(57) ABSTRACT

A liquid lens includes an orientation sensor such as a gyroscope to compensate for the effects of motion. A raw gyroscope signal, including noise components, can be provided to the controller without processing by phase-shifting filters. One or more filters can be applied to the raw gyroscope signal to allow a band of frequencies to pass without introducing phase delay. The controller can use a feed forward system to generate control output signals based at least in part on the raw gyroscope signal, including noise components. The control output signals can be used to drive voltage signals to electrodes to compensate for motion.

20 Claims, 7 Drawing Sheets

(58) Field of Classification Search
CPC ........... H04N 5/23248; H04N 5/23264; H04N 5/2328; H04N 5/23287; H04N 5/2257; G03B 2217/005; G03B 2205/00; G03B 9/06; G03B 5/06; G03B 13/36
USPC ............... 359/554, 557, 642, 648, 665, 666; 250/201.1, 201.2, 201.4; 348/208.99, 348/208.2, 208.12; 396/52, 55
See application file for complete search history.

(56) References Cited

FOREIGN PATENT DOCUMENTS

| | | | |
|---|---|---|---|
| CN | 104954666 | A | 9/2015 |
| CN | 107615159 | A | 1/2018 |
| CN | 211043806 | U | 7/2020 |
| WO | 2016/194307 | A1 | 12/2016 |

OTHER PUBLICATIONS

Hank Zumbahlen: "Phase Response in Active Filters Part 3—The Band-Pass Response", Mar. 1, 2016, XP055612453, Retrieved from the Internet: URL:https://www.analog.com/en/analog-dialogue/articles/band-pass-response-in-active-filters.html.

International Search Report and Written Opinion of the International Searching Authority; PCT/US2019/032400; dated Sep. 2, 2019; 10 Pages; European Patent Office.

Paolo et al., "A 160 A, 8 mdps/[square root of] Hz frequency-modulated MEMS yaw gyroscope", 2017 IEEE International Symposium on Inertial sensors and systems (inertial), Mar. 27, 2017, pp. 1-4.

* cited by examiner

LIQUID LENS CONTROL SYSTEMS AND METHODS WITH REDUCED PHASE DELAY

CROSS-REFERENCE TO RELATED APPLICATIONS

This application claims the benefit of priority under 35 U.S.C. § 371 of International Application No. PCT/US2019/032400, filed on May 15, 2019, which claims the benefit of priority under 35 U.S.C. § 119 of U.S. Provisional Application No. 62/674,530, filed May 21, 2018, the content of which is incorporated herein by reference in its entirety.

TECHNICAL FIELD

Some embodiments of this disclosure relate to liquid lenses and control systems and control methods for liquid lenses. Some examples herein more specifically discuss control systems and control methods for adjusting a liquid lens for stability and/or positioning in response to one or more signals from a position or movement indicator, such as a gyroscope.

DETAILED DESCRIPTION OF CERTAIN EMBODIMENTS

Liquid Lens System

Figure 1:
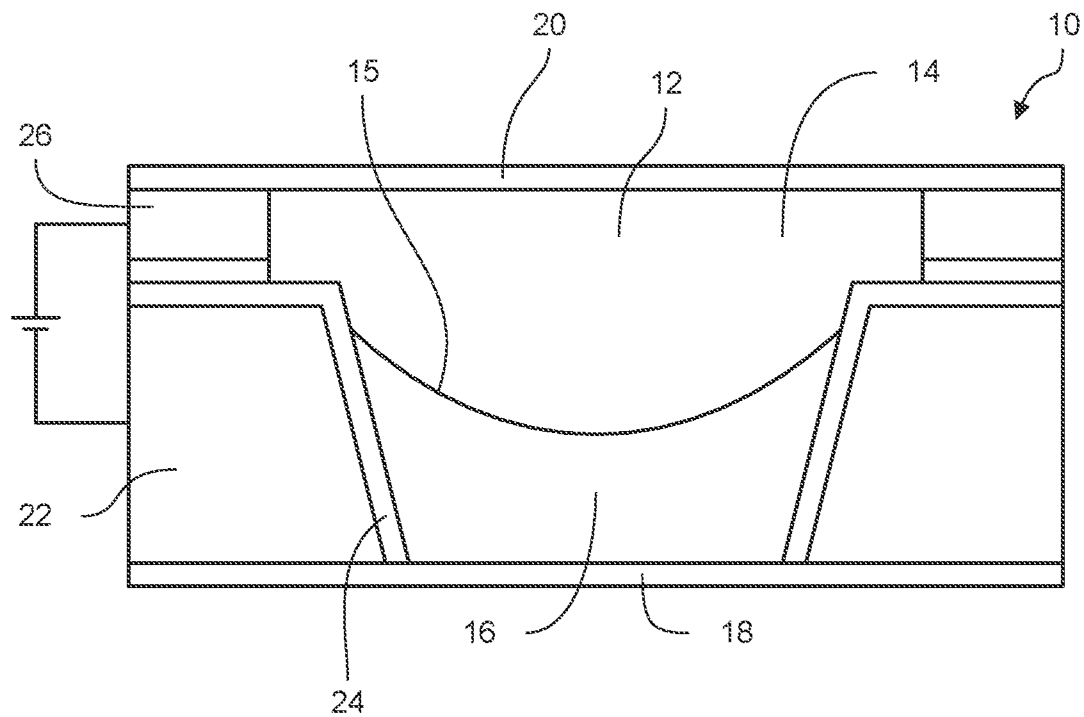
FIG. 1 is a cross-sectional view of an example embodiment of a liquid lens.

FIG. 1 is a cross-sectional view of an example embodiment of a liquid lens 10. The liquid lens 10 can have a cavity 12 that contains at least two fluids (e.g., liquids), such as first fluid 14 and a second fluid 16. The two fluids can be substantially immiscible so that a fluid interface 15 is formed between the first fluid 14 and the second fluid 16. The two fluids 14 and 16 can be sufficiently immiscible such that the fluid interface 15, when curved, can refract light with optical power as a lens. The first fluid 14 can be electrically conductive, and the second fluid 16 can be electrically insulating. The first fluid 14 can be a polar fluid, such as an aqueous solution, in some embodiments. The second fluid 16 can be an oil, in some embodiments. The first fluid 14 can have a higher dielectric constant than the second fluid 16. The first fluid 14 and the second fluid 16 can have different indices of refraction, for example so that light can be refracted at it passes through the fluid interface 15. The first fluid 14 and the second fluid 16 can have substantially similar densities, which can impede either of the fluids 14 and 16 from floating relative to the other.

The cavity 12 can include a portion having a shape of a frustum or truncated cone. The cavity 12 can have angled side walls. The cavity 12 can have a narrow portion where the side walls are closer together and a wide portion where the side walls are further apart. The narrow portion can be at the bottom end of the cavity 12 and the wide portion can be at the top end of the cavity 12 in the orientation shown, although the liquid lenses 10 disclosed herein can be positioned at various other orientations. The edge of the fluid interface 15 can contact the angled side walls of the cavity 12. The edge of the fluid interface 15 can contact the portion of the cavity 12 having the frustum or truncated cone shape. Various other cavity shapes can be used. For example, the cavity can have curved side walls (e.g., curved in the cross-sectional view of FIGS. 1-2). The side walls can conform to the shape of a portion of a sphere, toroid, or other geometric shape. In some embodiments, the cavity 12 can have a cylindrical shape. In some embodiments, the cavity can have a flat surface and the fluid interface can contact the flat surface (e.g., as a drop of the second fluid 16 sitting on the base of the cavity 12).

A lower window 18, which can include a transparent plate, can be below the cavity 12. An upper window 20, which can include a transparent plate, can be above the cavity 12. The lower window 18 can be located at or near the narrow portion of the cavity 12, and/or the upper window 20 can be located at or near the wide portion of the cavity 12. The lower window 18 and/or the upper window 20 can be configured to transmit light therethrough. The lower window 18 and/or the upper window 20 can transmit sufficient light to form an image, such as on an imaging sensor of a camera. In some cases, the lower window 18 and/or the upper window 20 can absorb and/or reflect a portion of the light that impinges on thereon.

A first one or more electrodes 22 (e.g., insulated electrodes) can be insulated from the fluids 14 and 16 in the cavity 12, such as by an insulation material 24. A second one or more electrodes 26 can be in electrical communication with the first fluid 14. The second one or more electrodes 26 can be in contact with the first fluid 14. In some embodiments, the second one or more electrodes 26 can be capacitively coupled to the first fluid 14. Voltages can be applied between the electrodes 22 and 26 to control the shape of the fluid interface 15 between the fluids 14 and 16, such as to vary the focal length of the liquid lens 10. Direct current (DC) voltage signals can be provided to one or both of the electrodes 22 and 26. Alternating current (AC) voltage signals can be provided to one or both of the electrodes 22 and 26. The liquid lens 10 can respond to the root mean square (RMS) voltage signal resulting from the AC voltage (s) applied. In some embodiments, AC voltage signals can impede charge from building up in the liquid lens 10, which can occur in some instances with DC voltages. In some embodiments, the first fluid 14 and/or the second one or more electrodes 26 can be grounded. In some embodiments, the first one or more electrodes 22 can be grounded. In some embodiments, voltage can be applied to either the first electrode(s) 22 or the second electrode(s) 26, but not both, to produce voltage differentials. In some embodiments, voltage signals can be applied to both the first electrode(s) 22 and the second electrode(s) 26 to produce voltage differentials.

Figure 2:
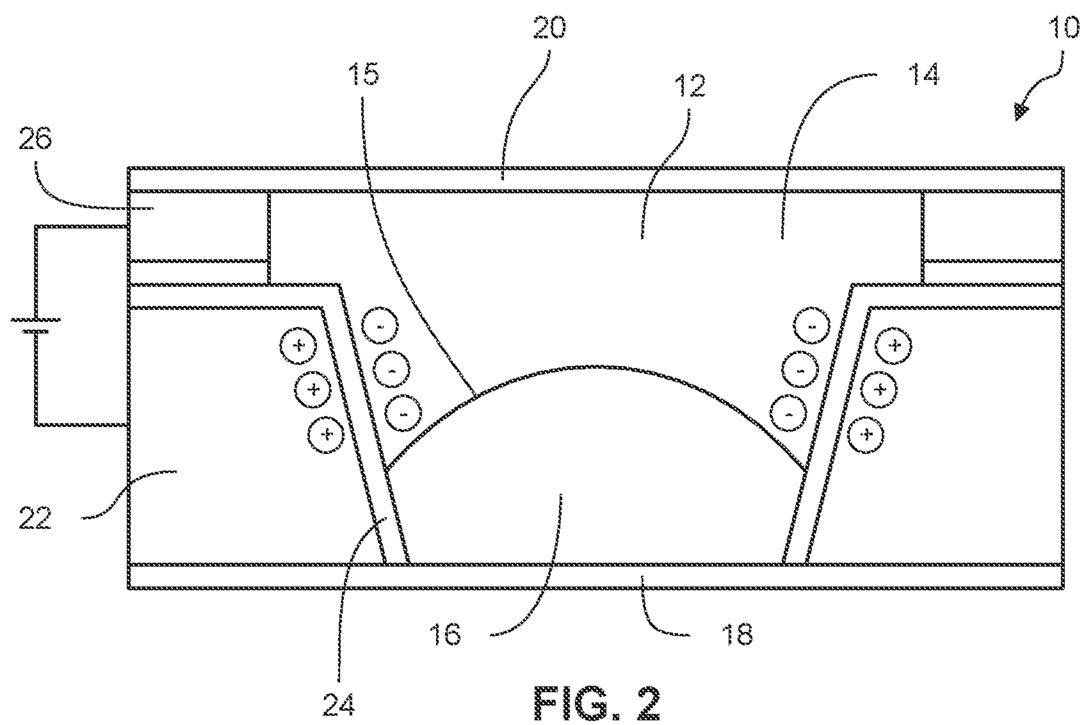
FIG. 2 shows the liquid lens in a second state where a voltage is applied.

FIG. 1 shows the liquid lens 10 in a first state where no voltage is applied between the electrodes 22 and 26, and FIG. 2 shows the liquid lens 10 in a second state where a voltage is applied between the electrodes 22 and 26. The chamber 12 can have one or more side walls made of a hydrophobic material. For example the insulating material 24 can be parylene, which can be insulating and hydrophobic, although various other suitable materials can be used. When no voltage is applied, the hydrophobic material on the side walls can repel the first fluid 14 (e.g., an aqueous solution) so that the second fluid 16 (e.g., an oil) can cover a relatively large area of the side walls to produce the fluid interface 15 shape shown in FIG. 1. When a voltage is applied between the first electrode 22 and the first fluid 14 (e.g., via the second electrode 26), the first fluid 14 can be attracted to the first electrode 22, which can drive the location of the fluid interface 15 down the side wall so that more of the side walls is in contact with the first fluid 14. Changing the applied voltage differential can change the contact angle between the edge of the fluid interface 15 and the surface of the cavity 12 (e.g., the angled side wall of the truncated cone portion of the cavity 12) based on the principle of electrowetting. The fluid interface 15 can be driven to various different positions by applying different amounts of voltage between the electrodes 22 and 26, which can produce different focal lengths or different amounts of optical power for the liquid lens 10.

Figure 3:
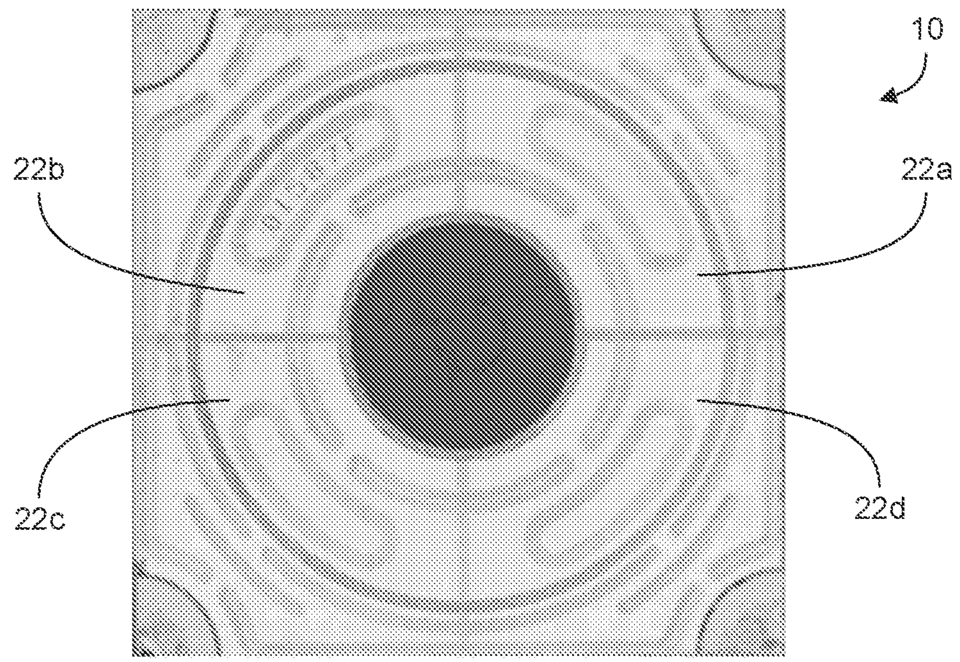
FIG. 3 shows a plan view of an example embodiment of a liquid lens.
Figure 4:
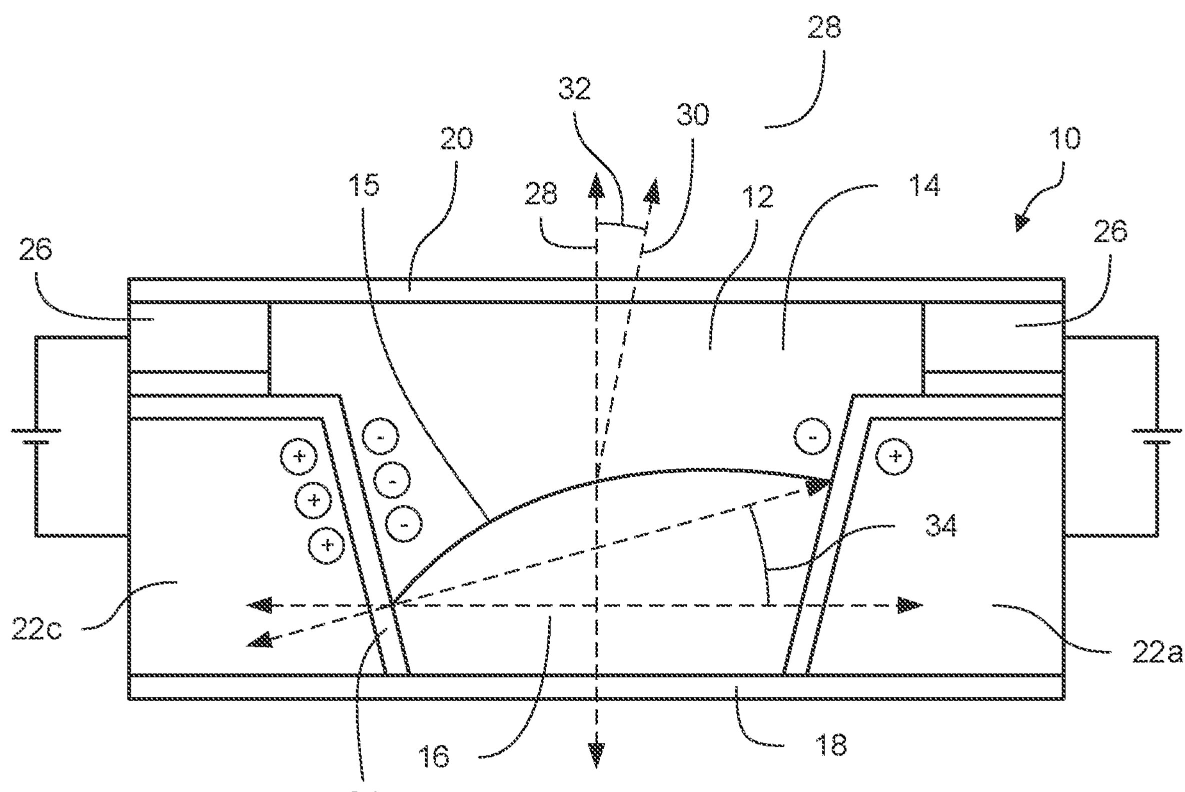
FIG. 4 shows a cross-sectional view taken through opposing electrodes.

FIG. 3 shows a plan view of an example embodiment of a liquid lens 10. In some embodiments, the first one or more electrodes 22 (e.g., insulated electrodes) can include multiple electrodes 22 positioned at multiple locations on the liquid lens 10. The liquid lens 10 can have four electrodes 22*a*, 22*b*, 22*c*, and 22*d*, which can be positioned in four quadrants of the liquid lens 10. In other embodiments, the first one or more electrodes 22 can include various numbers of electrodes (e.g., 1 electrode, 2 electrodes, 4 electrodes, 6 electrodes, 8 electrodes, 12 electrodes, 16 electrodes, 32 electrodes, or more, or any values therebetween). Although various examples are provided herein with even numbers of insulated electrodes 22, odd numbers of insulated electrodes 22 can also be used. The electrodes 22*a-d* can be driven independently (e.g., having the same or different voltages applied thereto), which can be used to position the fluid interface 15 at different locations on the different portions (e.g., quadrants) of the liquid lens 10. FIG. 4 shows a cross-sectional view taken through opposing electrodes 22*a* and 22*c*. If more voltage is applied to the electrode 22*c* than to the electrode 22*a*, as shown in FIG. 4, the fluid interface 15 can be pulled further down the sidewall at the quadrant of the electrode 22*c* than at the quadrant of the electrode 22*a*.

The tilted fluid interface 15 can turn light that is transmitted through the liquid lens 10. The liquid lens 10 can have an axis 28. The axis 28 can be an axis of symmetry for at least a portion of the liquid lens 10. For example, the cavity 12 can be substantially rotationally symmetrical about the axis 28. The truncated cone portion of the cavity 12 can be substantially rotationally symmetrical about the axis 28. The axis 28 can be an optical axis of the liquid lens 10. For example, the curved and untilted fluid interface 15 can converge light towards, or diverge light away from, the axis 28. The axis 28 can be a longitudinal axis of the liquid lens 10, in some embodiments. Tilting the fluid interface 15 can turn the light 30 passing through the tilted fluid interface relative to the axis 28 by an optical tilt angle 32. The light 30 that passed through the tilted fluid interface 15 can converge towards, or diverge away from, a direction that is angled by the optical tilt angle 32 relative to the direction along which the light entered the liquid lens 10. The fluid interface 15 can be tilted by physical tilt angle 34 that produces the optical tilt angle 32. The relationship between the optical tilt angle 32 and the physical tilt angle 34 depends at least in part on the indices of refraction of the fluids 14 and 16.

The optical tilt angle 32 produced by tilting the fluid interface 15 can be used by a camera system to provide optical image stabilization, off-axis focusing, etc. In some cases different voltages can be applied to the electrodes 22*a-d* to compensate for forces applied to the liquid lens 10 so that the liquid lens 10 maintains on-axis focusing. Voltages can be applied to control the curvature of the fluid interface 15, to produce a desired optical power or focal length, and the tilt of the fluid interface 15, to produce a desired optical tilt (e.g., an optical tilt direction and an amount of optical tilt). Accordingly, the liquid lens 10 can be used in a camera system to produce a variable focal length while simultaneously producing optical image stabilization.

Camera System

Figure 5:
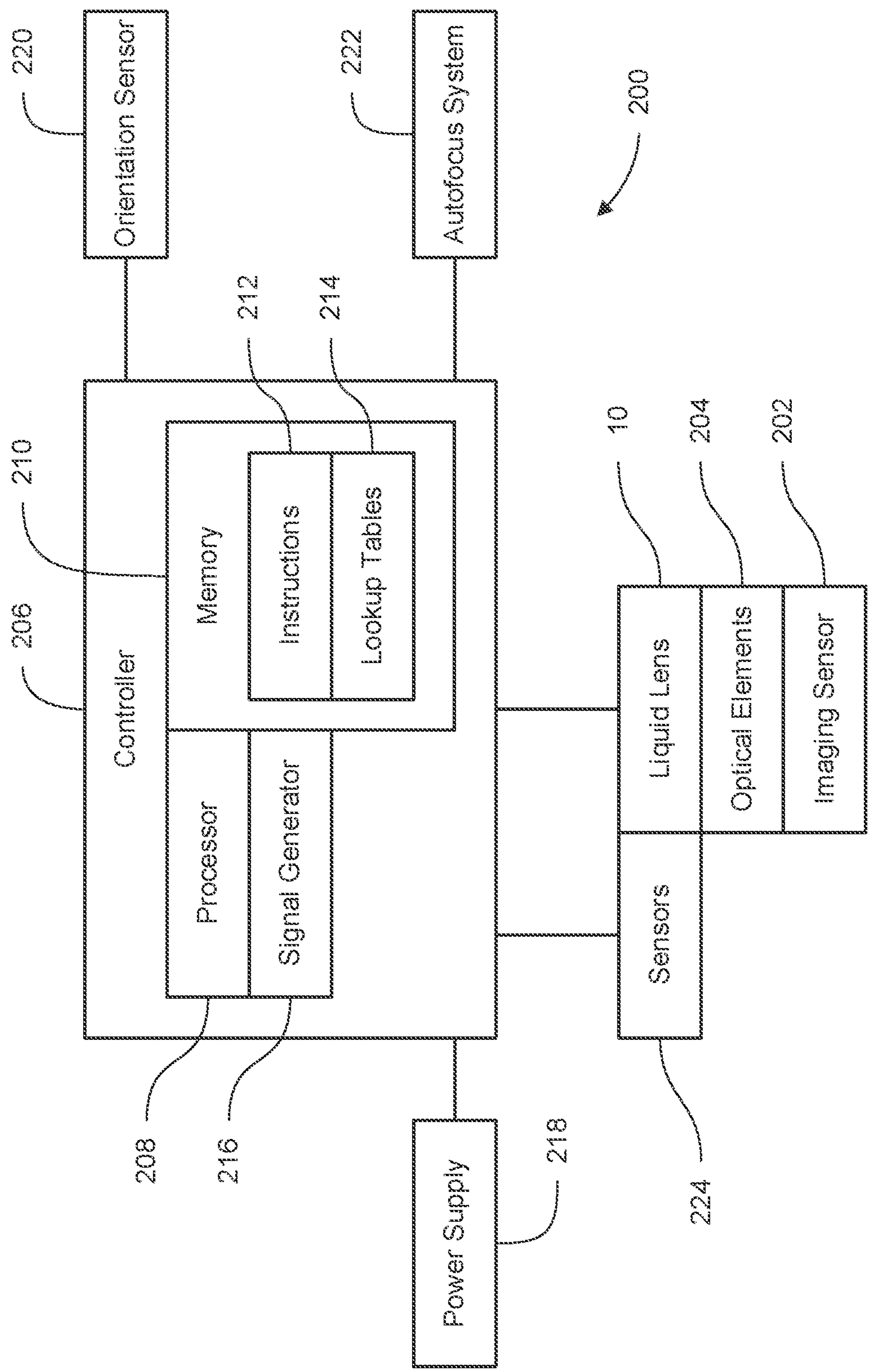
FIG. 5 is a block diagram of an example embodiment of a camera system that includes a liquid lens.

FIG. 5 is a block diagram of an example embodiment of a camera system 200 that includes a liquid lens 10, which can include features of any of the liquid lens embodiments disclosed herein. The camera system 200 can include an imaging sensor 202, which can be used to produce an image from light that impinges on the imaging sensor 202. The imaging sensor 202 can be a charge-coupled device (CCD) sensor, a complementary metal-oxide semiconductor (CMOS) sensor, or any other suitable electronic imaging sensor. In some embodiments, photographic film can be used to produce an image, or any other suitable type of imaging sensor. The liquid lens 10 can direct light toward the imaging sensor 202. In some embodiments, the camera system 200 can include one or more additional optical elements 204 that operate on the light propagating toward the imaging sensor 202. The optical elements 204 can include one or more fixed lenses (e.g., a fixed lens stack), one or more movable lenses, one or more optical filters, or any other suitable optical elements for producing desired optical effects. The liquid lens 10 can operate on the light propagating towards the imaging sensor 202 before the one or more optical elements 204, after the one or more optical elements 204, or the liquid lens 10 can be positioned optically between optical elements 204. When light is described herein as propagating towards a component (e.g., towards the imaging sensor 202), the light can be propagating along a path that directly or indirectly leads to the component. For example, light can pass through the liquid lens 10 in a first direction while propagating along an optical path towards the imaging sensor 202, and the light can be redirected (e.g., reflected by a mirror and/or turned by refraction) to continue in a second direction (which can be different than, and even opposite to, the first direction) along the optical path towards the imaging sensor 202.

The camera system 200 can include a controller 206 for operating the liquid lens 10, for example to implement the liquid lens features and functionality disclosed herein. The controller 206 can operate other aspects of the camera system 200 as well. For example, a single controller 206 can operate the liquid lens 10, can operate the imaging sensor 202, can store images produced by the imaging sensor 202, can operate other components of the camera, such as a display, a shutter, a user interface, etc. In some embodiments, any suitable number of controllers can be used to operate the various aspects of the camera system 200. The controller 206 can output voltage signals to the liquid lens 10. For example, the controller 206 can output voltage signals to the insulated electrode(s) 22 and/or the electrode (s) in electrical communication with the conductive fluid 14, and the voltage signals can control the curvature of the fluid interface 15 (e.g., to produce a desired optical power) and/or to control the tilt of the fluid interface 15 (e.g., to produce a desired optical tilt). The controller 206 can output DC voltage signals, AC voltage signals, pulsed DC voltage signals, or any other suitable signals for driving the liquid lens 10.

The controller 206 can include at least one processor 208. The processor 208 can be a hardware processor. The processor 208 can be a computer processor. The processor 208 can be in communication with a computer-readable memory 210. The memory 210 can be non-transitory computer-readable memory. The memory 210 can include one or more memory elements, which can be of the same or different types. The memory 210 can include a hard disk, flash memory, RAM memory, ROM memory, or any other suitable type of computer-readable memory. The processor 206 can execute computer-readable instructions 212 stored in the memory 210 to implement the functionality disclosed herein. In some embodiments, the processor 208 can be a general purpose processor. In some embodiments, the processor 208 can be a specialized processor that is specially configured to implement the functionality disclosed herein. The processor 208 can be an application specific integrated circuit (ASIC) and/or can include other circuitry configured to perform the functionality disclosed herein, such as to operate the liquid lens 10 as discussed herein.

The memory 210 can include one or more lookup tables 214, which can be used in determining the voltage signals to be applied to the liquid lens 10. The processor 208 can be configured to implement, and/or the computer-readable instructions 212 can include, one or more algorithms, equations, or formulas to be used in determining the voltage signals to be applied to the liquid lens 10. The processor 208 can determine the voltages to be applied to the liquid lens 10 (e.g., using one or more lookup tables 214 and/or one or more algorithms, equations, or formulas). Other information can be stored in the memory 210, such as images produced by the camera system 200, instructions for operating other components of the camera system 200, etc.

The controller 206 can include a signal generator 216, which can generate the voltage signals to be provided to the liquid lens 10. The signal generator 216 can generate the voltage signals in response to the voltage values determined by the processor 208. The signal generator 216 can include one or more amplifiers, switches, H-bridges, half-bridges, rectifiers, and/or any other suitable circuitry for producing the voltage signals. A power supply 218 can be used to produce the voltage signals to be provided to the liquid lens 10. The power supply 218 can be a battery, a DC power source, an AC power source, or any suitable source of electrical power. The signal generator 216 can receive power from the power supply 218 and can modulate or otherwise modify the electrical signals (e.g., based on determinations made by the processor 208) to provide driving signals to the liquid lens 10. In some embodiments, the processor 208 and the signal generator 216 can be implemented together is a single integrated circuit (IC) or in combined circuitry.

In some embodiments, the controller 206 can receive input from an orientation sensor 220, such as a gyroscope, accelerometer, and/or other suitable sensor for providing information regarding the orientation of the camera system 200 and/or the liquid lens 10. In some embodiments, the orientation sensor 220 can be a MEMS (micro-electro-mechanical system) device. The orientation sensor 220 can provide a measurement of angular velocity, acceleration, or any suitable measurement that can be used to determine a desired optical tilt for the liquid lens 10. In some cases, when the camera system 200 shakes (e.g., in response to being held by a human, or vibrations from a driving car, etc.) the orientation sensor 220 (e.g., gyroscope) can provide input to the controller 206 regarding the shaking, and the liquid lens 10 can be driven to at least partially counter the shaking of the camera system 200 by controlling the tilt of the fluid interface 15 (e.g., tilt direction and amount of tilt).

The controller 206 (e.g., using the processor 208) can determine an optical tilt amount (e.g., angle 32) and/or an optical tilt direction (e.g., an angle) based at least in part on the input received from the orientation sensor 220, although in some embodiments these parameters can be received by the liquid lens controller 206 (e.g., determined by the orientation sensor 220 or some other component of the camera system 200). The signals for driving the liquid lens 10 (e.g., voltage signals) can be determined at least in part based on the optical tilt amount and/or optical tilt direction. In some cases, the controller 206 (e.g., using the processor 208) can determine a physical tilt amount (e.g., angle 34) and/or a physical tilt direction (e.g., an azimuthal angle) for the fluid interface 15. These can be determined from the optical tilt amount and/or optical tilt direction, or can be determined directly from the input received from the orientation sensor 220. The controller 206 (e.g., using the processor 208) can determine driver signals (e.g., voltages) for the electrodes (e.g., the insulated electrodes 22*a-d* in the embodiment of FIG. 3) to implement the physical tilt of the fluid interface 15. In some embodiments, the driver signals can be determined from the input received from the orientation sensor 220 directly, such as without determining the desired optical tilt, without determining the desired physical tilt of the fluid interface 15, and/or without determining any other intermediate values or parameters.

Many variations are possible. In some embodiments, the orientation sensor 220 can be omitted. For example, the camera system 200 can perform optical image stabilization (OIS) in response to image analysis or any other suitable approach. The controller 206 can receive OIS input information (e.g., derived by any suitable approach), and can control tilt of the fluid interface 15 in response to that OIS input information. In some cases, the lens tilt can be used for purposes other than OIS, such as for off-axis imaging. By way of example, the camera system 200 can zoom into a portion of the image that is not located at the center of the image. Controlling the tilt of the fluid interface 15 of the liquid lens 10 can, at least in part, be used to control the direction and amount of offset from center for the optical zoom. Although, not shown in FIG. 5, various embodiments disclosed herein can include two liquid lenses, such as for implementing an optical zoom function. The controller 206 can receive focal direction input information (e.g., for OIS or off-axis imaging), and can control tilt of the fluid interface 15 in response to that focal direction input information.

The controller 206 can receive optical power information. The input optical power information can include a target optical power (e.g., diopters) a target focal length, or other information that can be used to determine the curvature for the fluid interface 15. The optical power information can be determined by an autofocus system 222 of the camera system 200, can be set by input from a user (e.g., provide to a user interface of the camera system 200), or provided from any other source. In some embodiments, the controller 206 can determine the optical power information. For example, the controller 206 can be used to implement the autofocus system that determines a desired optical power or focal length. In some cases, the controller 206 can receive the optical power information and can determine a corresponding optical power for the liquid lens 10, for example since the other optical elements 204 can also affect the optical power (e.g., statically or dynamically). The controller 206 (e.g., using the processor 208) can then determine driver signal(s) (e.g., voltages) for the electrode(s) to control the curvature of the fluid interface 15. In some cases, the controller 206 can determine the driver signal(s) directly from autofocus data or directly from optical power information, such as without determining a value for the optical power of the liquid lens and/or without determining any other intermediate values.

The controller 206 (e.g., using the processor 208) can use the focal direction information (e.g., OIS information, orientation information, shake information, etc.) and the focal length information (e.g., optical power information, autofocus information, etc.) together to determine the driver signal (s) for the liquid lens 10. For example, the driver signals to produce 1 degree of optical tilt and 3 diopters of optical power can be different than the driver signals to produce 1 degree of optical tile and 5 diopters of optical power. Various lookup tables 214, formulas, equations, and/or algorithms can be used to determine the driver signals based on both the focal length information and the focal direction information.

In some embodiments, the controller 206 can receive feedback and can drive the liquid lens 10 based at least in part on the feedback. The controller 206 can use a closed loop control scheme for driving the liquid lens 10. In some embodiments, the one or more sensors 224 can provide information to the controller, such as information regarding the fluid interface 15 position in the liquid lens 10. The sensors 224 can provide information regarding the fluid interface position for each of the insulated electrodes 22*a*-*d*. For example, the sensor 224 can provide a feedback signal that is indicative of the capacitance between the corresponding insulated electrode 22*a*-*d* and the first fluid 14. In some embodiments, the controller 206 can use a PID control scheme, an open loop control scheme, feed forward control scheme, or any other suitable approach for controlling the liquid lens 10.

In some embodiments, the liquid lens 10 can be used in systems other than a camera system 200, such as an optical disc reader, an optical fiber input device, a device for reading output from an optical fiber, an optical system for biological measurement (e.g., inducing fluorescence in a biological sample), endoscopes, an optical coherence tomography (OCT) device, a telescope, a microscope, other types of scopes or magnifying devices, etc. Many of the principles and features discussed herein can relate to liquid lenses 10 used in various contexts. A liquid lens system can include a liquid lens 10 and a controller 206 for controlling the liquid lens. In some embodiments, various camera elements, such as the imaging sensor 202, autofocus system 222, orientation sensor 220, and/or other optical elements 204 can be omitted.

Optical Image Stabilization Details

A camera system can use signals from a gyroscope (or other orientation sensor) to determine driver signals to be applied to a liquid lens for positioning the fluid interface, such as to tilt the fluid interface to compensate for shaking or other motion of the camera system. Signals from the gyroscope can include noise, and in some implementations filters (e.g., hardware filters) can be used to reduce or otherwise mitigate noise in the gyroscope signals. This filtering can produce delay in the gyroscope signals (e.g., phase delay). The delay can impede the camera system from using the liquid lens to compensate for the motion. For example, if the camera system determines driver signals to tilt the fluid interface of the liquid lens using processed gyroscope signals that have substantial phase delay, the camera system can cause the fluid interface to oscillate out of phase with the vibration motion. In some embodiments, the system can use unfiltered gyroscope signals to determine driver signals, such as for optical image stabilization. In some cases, some filtering can be performed, such as a low pass filter, a high pass filter, and/or a bandpass filter, which can be configured to not produce substantial phase delay. In some cases, no hardware filtering is performed on the gyroscope signals. In some cases, software filtering can be performed (e.g., to implement the high pass, low pass, and/or band pass filter). In some cases, no filtering is performed on analog signals from the gyroscope, while some filtering can be performed after the analog signals are converted to digital signals. Even when a high pass, low pass, and/or bandpass filter is used, the gyroscope signals that are passed through can be unfiltered. Gyroscope signals with unfiltered noise can be used to determine drive signals for the liquid lens. The liquid lens can have a response time that is slower than the rate at which the gyroscope signals are provided, which can cause the liquid lens itself to operate as a filter on the gyroscope signals. Because the fluid interface does not move instantly to the location prescribed by each value of the gyroscope signals, the liquid lens can effectively smooth out the gyroscope signals. The surprising result is that, in some cases, less filtering or no filtering of the gyroscope signals can enable the liquid lens to better perform optical image stabilization, such as to better compensate for vibration or other motion of the camera system. Another surprising result is that, in some cases, driving the liquid lens based at least in part on input signals (e.g., from a gyroscope) that are significantly faster than the response time of the liquid lens can enable the liquid lens to perform effective optical image stabilization.

Figure 6:
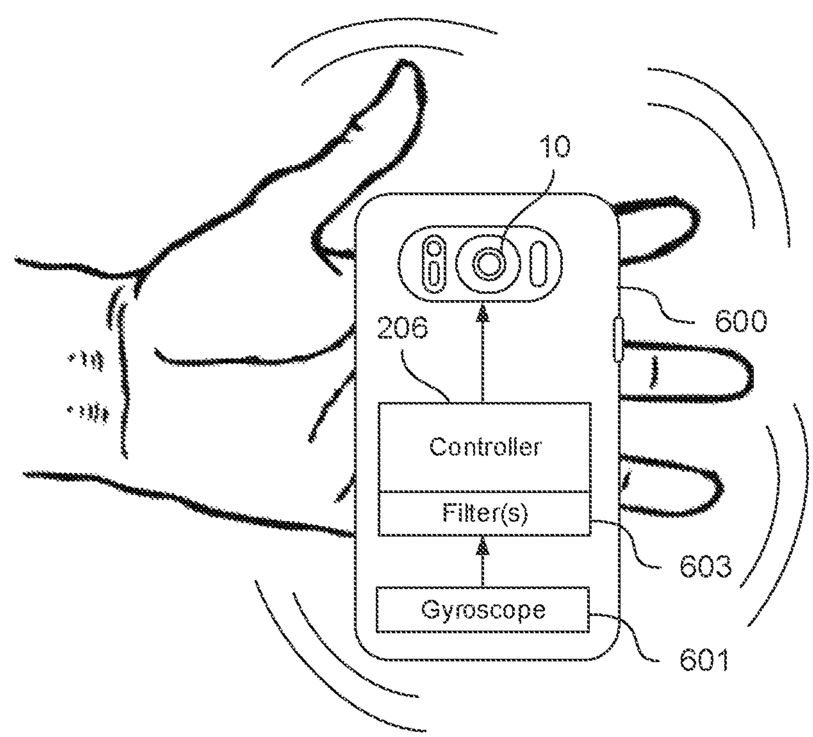
FIG. 6 shows an example camera system.

FIG. 6 shows an example camera system 600. The camera system 600 can include a liquid lens 10. The camera system 600 can also include a gyroscope 601 and a controller 206 with one or more filters 603 on the inside. Although various embodiments are discussed herein as using a gyroscope, any other suitable orientation or motion sensor can be used, such as an accelerometer. The camera system 600 with the liquid lens 10 can be implemented, for example, in a camera, in a smartphone, in a vehicle, on an appliance, in a webcam, in a laptop, on a monitor, on a TV, in a video game console, on a drone, or in a variety of other devices. In FIG. 6, a person is holding a smartphone that includes the liquid lens 10 in the person's hand. The person's hand may not be perfectly steady. This can happen, for example, due to involuntary muscle movements and twitches, breathing, pulsing blood, etc. Movement can happen in other applications as well. For example, a vehicle can use the camera system 600 as a backup camera or for visual input to a self-driving car system or AI driving system. The car may move when driving and may experience motion even when the wheels are stationary due to the vibration of the engine, the movements of passengers, etc.

Motion of the camera system 600 can degrade the images produced by the camera system 600. For example, the motion can cause image shake in a video and/or can cause blurring in still images. The gyroscope 601 is an example orientation sensor 220 discussed with respect to FIG. 5. The gyroscope (or other orientation sensor) can be used to detect movement of the liquid lens 10. The controller 206 can receive signals from the gyroscope 601 and adjust the voltage signals that are provided to the electrodes to at least partially compensate for the motion. Accordingly, the liquid lens 10 can steadily maintain a desired focus, even in the presence of motion.

The gyroscope 601 can generate one or more raw gyroscope signals indicative of motion. For example, the gyroscope can generate an analog voltage signal that is proportional to or otherwise indicates an angular velocity (e.g., about an axis) (or other type of motion). As another example, the gyroscope can generate a digital signal that encodes or otherwise indicates an angular velocity (e.g., about an axis) (or other type of motion). In some cases an analog to digital converter (e.g., which can be part of the gyroscope or any other suitable part of the camera system 600) can covert analog gyroscope signals (e.g., voltage signals) to digital gyroscope signals. Due to various sources of electrical, magnetic, mechanical, and/or other sources of noise, for example, the raw gyroscope signals can include a noise component, e.g., which can make the raw gyroscope signal less accurate in representing the angular velocity (or other type of motion). The noise component can be any component of the raw gyroscope signal that does not represent the angular velocity (or other type of motion) of the gyroscope 601. The noise component can include a broad range of frequency components. The noise can be non-Gaussian. The noise can be caused by thermal effects, integration effects, silicon noise effects, etc.

The controller 206 can be configured to generate a control output signal to control the liquid lens based at least in part on an output signal from the gyroscope 601 to at least partially compensate for the effects of motion (e.g., such that the liquid lens 10 achieves and/or maintains a desired focus). The controller 206 may be configured to respond to a range of frequency components of the signals generated by the gyroscope.

In some applications that use a gyroscope, a filter can be used to filter out noise. In some approaches, a system can attempt to filter out as much noise as possible in an effort to improve performance. Some implementations can follow the approach that a cleaner gyroscope signal with less noise would improve performance. At least one realization that relates to certain embodiments disclosed herein is that actively and/or passively filtering the raw gyroscope signal (e.g., within the range of frequency components that the controller 206 is configured to respond to) may cause degraded performance. Indeed, a counter-intuitive result can occur: when the controller 206 receives unfiltered signals that include noise, the performance of the liquid lens can improve. Without being limited by theory, it is believed that the counter-intuitive result occurs, at least in part, because some filters can cause phase delays that can negatively affect operation of the liquid lens, and that performing less filtering or no filtering can result in less or no phase delay, which can enable the liquid lens to better compensate for vibration or other motion, even despite the noise in the gyroscope signals. In some cases, hardware filtering or active filters that include at least one active component, such as a switch or amplifier, can cause relatively long phase delays (e.g., as compared to digital or software-based filtering).

One or more filters 603 can be used to filter the raw gyroscope signals generated by the gyroscope 601. The filters can be implemented in software, such as using one or more microcontrollers, digital signal processors, field programmable gate arrays, or other digital processor. In some embodiments, the filters can be implemented as passive hardware filters using passive components. The one or more filters 603 can act as a bandpass filter to pass the raw gyroscope signal within a bandpass frequency range. The bandpass filter can block or attenuate the raw gyroscope signals that are outside the bandpass frequency range. Accordingly, the controller 206 can generate a control output signal based on components of the raw gyroscope signal that are within the bandpass frequency range, including gyroscope noise components within the bandpass frequency range. The controller 206 can use substantially unfiltered gyroscope signals within the bandpass frequency, where the signals inside the bandpass frequency can remain unfiltered (e.g., except for residual effects of the low pass filter, or high pass filter, or bandpass filter that produced the bandpass frequency). The one or more filters 603 can produce a delay of less than about 30 degrees, about 25 degrees, about 20 degrees, about 15 degrees, about 10 degrees, about 5 degrees, about 3 degrees, about 2 degrees, about 1 degree, or about 0 degrees, or any values therebetween or any ranges bounded by these values. In some cases, the delay caused by the one or more filters 603 can be less than about 10 milliseconds, less than about 7 milliseconds, less than about 5 milliseconds, less than about 3 milliseconds, less than about 2 milliseconds, less than 1 millisecond, less than 0.5 milliseconds, or any values therebetween, or any ranges bounded by any of these values. In some embodiments, the gyroscope signals can be used to drive the liquid lens with substantially no filtering phase delay. The filtering (e.g., bandpass filtering) can be performed on the digital signals. In some cases, small delays can be caused by the analog to digital conversion of the signals, and the execution of digital calculations. In some embodiments, the gyroscope signals used by the controller 206 can have noise (e.g., in the bandpass frequency range) of at least about 2 mdps per square root Hz, about 3 mdps per square root Hz, about 4 mdps per square root Hz, about 5 mdps per square root Hz, about 6 mdps per square root Hz, about 7 mdps per square root Hz, about 8 mdps per square root Hz, about 9 mdps per square root Hz, about 10 mdps per square root Hz, about 11 mdps per square root Hz, about 12 mdps per square root Hz, or any values therebetween, or any ranges bounded by any of these values, although other values are also possible. In these examples "mdps" is millidegrees per second. The noise can be a noise power spectral density.

Outside of the bandpass frequency range, the one or more filters 603 can be used to attenuate low frequency components (e.g., using a high pass filter) and/or to attenuate high frequency components (e.g., using a low pass filter). This can impede the controller 206 from attempting to compensate for low frequency components and/or high frequency components of the raw gyroscope signal, which can create a "drifting" effect or can otherwise cause the liquid lens to operate inaccurately. The one or more filters 603 can attenuate low frequency components that are below a cutoff frequency, which can be about 10 Hz, about 7 Hz, about 5 Hz, about 3 Hz, about 2 Hz, about 1.5 Hz, about 1 Hz, about 0.75 Hz, about 0.5 Hz, about 0.25 Hz, or any values therebetween, or any ranges bounded by these values, although other values could also be used. The one or more filters 603 can attenuate high frequency components (e.g., using a low pass filter) such as that exceed a resonance frequency of liquids in the liquid lens, which can improve system stability. The one or more filters 603 can attenuate high frequency components that are above a cutoff frequency, which can be about 15 Hz, about 20 Hz, about 25 Hz, about 30 Hz, about 33 Hz, about 35 Hz, 38 Hz, 40 Hz, 45 Hz, about 50 Hz, or any values therebetween, or any ranges bounded by any of these values, although other frequencies can be used depending on the type of liquid(s), the size of the liquid lens, the shape of the chamber in the liquid lens, etc. As another counter-intuitive result, using fewer filters can improve the suppression ratio achieved by the optical image stabilization system (e.g., using the liquid lens). The suppression ratio (SR) can be determined using the following equation: SR=20*log(out/in), where “out” is the number of pixels of image shake produced without OIS, and where “in” is the number of pixels of image shake with OIS. By way of example, the fluid interface can be oscillated at a physical tilt of plus/minus 0.6 degrees at 10 Hz to produce image shake of 70 pixels with no OIS. With OIS the image shake can be reduced to 2 pixels. The suppression ration for this example is −30.88 dB. The suppression ration can be determined for various frequencies. For example the above example can be repeated at multiple frequencies (e.g., across an operating range of the liquid lens or camera system), such as 2 Hz, 4 Hz, 6 Hz, 8 Hz, 10 Hz, 12 Hz, etc. In some embodiments, the camera system 600 can achieve a suppression ratio of about −20 dB, about −22 dB, about −24 dB, about −26 dB, about −28 dB, about −30 dB, about −32 dB, about −34 dB, about −36 dB, or any values therebetween, or any ranges bounded by any combination of these values, although other suppression ratios can be implemented. The suppression ration values listed herein can be for a specific frequency (e.g., 2 Hz, 4 Hz, 6 Hz, 8 Hz, 10 Hz, 12 Hz). The suppression ratio values listed herein can be an average across multiple frequencies (e.g., across an operating range for the liquid lens and/or the camera system).

Example Control Systems

Figure 7A:
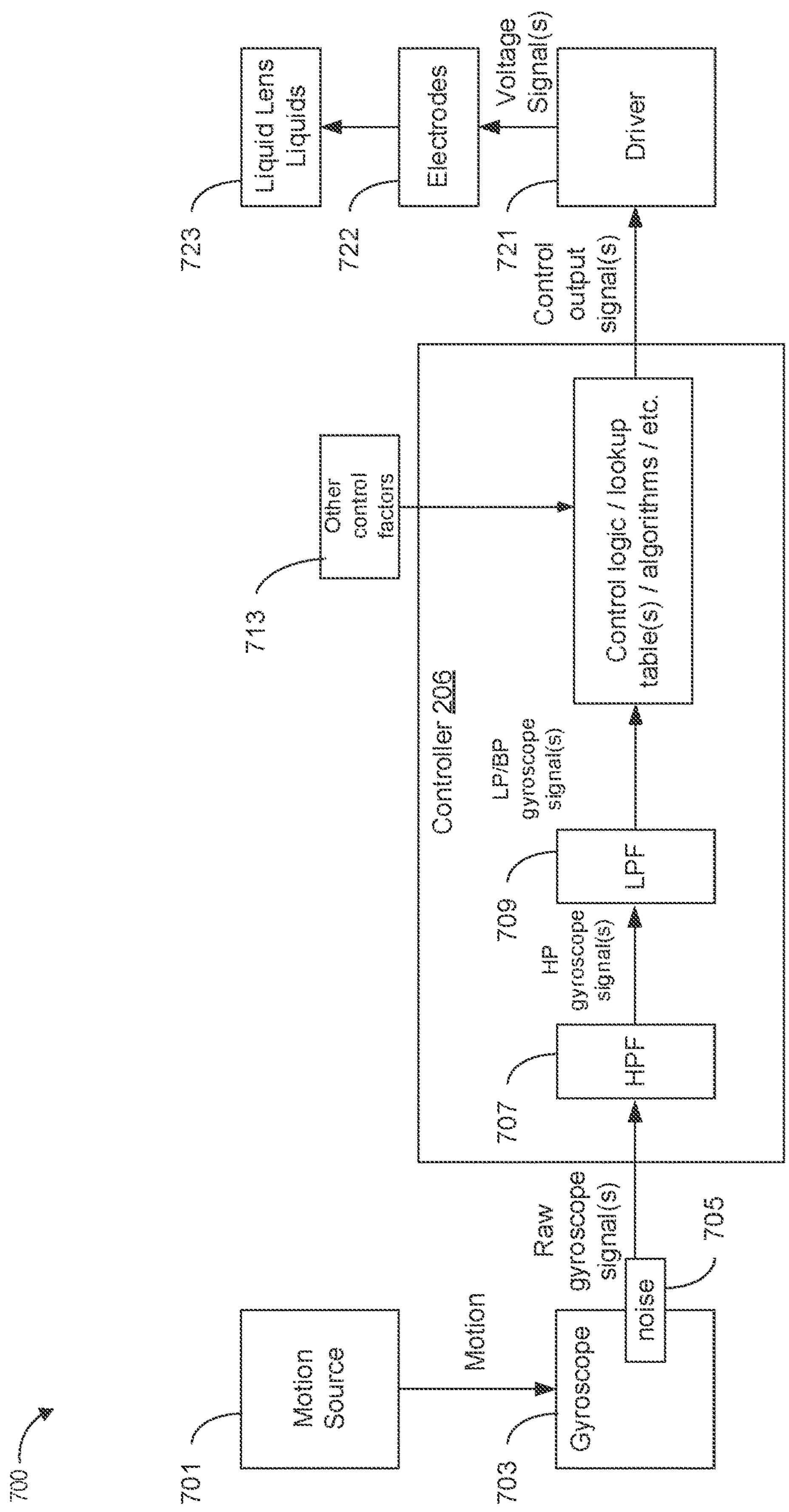
FIG. 7A shows a block diagram of an example control system.

FIG. 7A shows a block diagram of an example control system 700. The block diagram includes a motion source 701, a gyroscope 703, a noise source 705, a driver 721, electrodes 722, liquids in a liquid lens 723, and a controller 206 (e.g., which can have features similar to the discussion with respect to FIG. 5).

The control system 700 can be used for controlling a liquid lens based at least in part on output signals from a gyroscope 703 to compensate for motion. In the control system 700, a gyroscope signal can be transmitted to the controller 206 with reduced, little, or no phase delay. The gyroscope signal that is transmitted to the controller can include an unfiltered noise component such that the voltage signals for controlling the liquid lens are determined based at least in part on the unfiltered noise component.

The motion source 701 can be any source of motion that affects the liquid lens and/or other components of a camera system. Example sources of motion include a person holding a camera that includes a liquid lens, wind, motions of objects that a liquid lens is mounted on, vibrations through materials that a liquid lens is coupled to, etc.

A gyroscope 703 can be configured to measure motion that is caused by the motion source 701 and affects the liquid lens 723. The gyroscope can be rigidly mounted to or otherwise coupled to the liquid lens 723, a housing of the liquid lens 723, or other structure that the liquid lens 723 is mounted on such that motion affecting the liquid lens 723 (and/or other component(s) of the camera system) can be detected by the gyroscope 703.

The gyroscope 703 can be configured to generate one or more raw gyroscope signals indicating an angular velocity (e.g., about an axis or in a direction) (or other type of motion or orientation). In various embodiments, the raw gyroscope signals can be analog voltage signals or digital signals. In some embodiments the gyroscope can generate and/or update the digital signal at a rate of several kilohertz, such as about 2 kHz, about 5 kHz, about 6 kHz, about 7 kHz, about 8 kHz, about 9 kHz, about 10 kHz, about 12 kHz, about 15 kHz, about 20 kHz, about 25 kHz, or faster, or any values therebetween, or any ranges bounded by these values, although other values could be used. In some cases, higher performance (e.g., and more expensive) components may have faster speeds.

One or more sources of noise 705 can affect the raw gyroscope signal generated by the gyroscope. The noise component of the raw gyroscope signal can be a component that makes the raw gyroscope signal less accurate in representing the angular velocity (or other type of motion). The noise sources 705 can include thermal, electrical, magnetic, mechanical, and/or other sources of noise. The noise source 703 can originate from sources internal to or external to the gyroscope 703.

The controller 206 can include a microprocessor, digital signal processors, field programmable gate arrays, or other digital processor. The controller 206 can receive the raw gyroscope signals generated by the gyroscope 703. The controller 206 can use the raw gyroscope signals to generate one or more control output signals for a driver to apply one or more voltage signals to be applied to the liquid lens to at least partially compensate for motion experienced by the system. The controller 206 can operate at a frequency that is about as fast as or at least as fast as the gyroscope. The controller 206 can be configured to receive inputs (e.g., from the gyroscope and/or other sources) at a rate, and/or can be configured to update or change the control output signals at a rate, and the rate can be about 2 kHz, about 5 kHz, about 6 kHz, about 7 kHz, about 8 kHz, about 9 kHz, about 10 kHz, about 12 kHz, about 15 kHz, about 20 kHz, about 25 kHz, or faster, or any values therebetween, or any ranges bounded by these values, although other values could be used. In some cases, higher performance (e.g., more expensive) components may have faster speeds. In some cases a buffer can be used to store gyroscope signals or data until the controller 206 is ready to receive the gyroscope signals or data.

A high pass filter 707 and a low pass filter 709 can be applied to the raw gyroscope signals. The high pass filter 707 and/or the low pass filter 709 can be implemented in software by the controller 206. In various embodiments, either the high pass filter 707 or the low pass filter 709 can be applied first. In some cases a bandpass filter can be used, which can attenuate signals above a first threshold and below a second threshold, and can pass signals between the first and second thresholds. In some embodiments, only a low pass filter can be applied, or only a high pass filter can be applied, or no filtering can be performed on the gyroscope signals.

The high pass filter 707 can have a first cutoff frequency (e.g., where −3 dB attenuation is achieved) such that frequency components above the first cutoff frequency are passed and frequency components below the first cutoff frequency are attenuated. The low pass filter 709 can have a second cutoff frequency (e.g., where −3 dB attenuation is achieved) such that frequency components below the second cutoff frequency are passed and frequency components above the second cutoff frequency are attenuated. The second cutoff frequency can be a higher frequency than the first cutoff frequency. Together, the high pass filter 707 and the low pass filter 709 can function as a bandpass filter. The high pass filter 707 and/or the low pass filter 709 can be implemented using one or more Bessel filters, Butterworth filters, Chebyshev filters, Gaussian filters, Elliptical filters, boxcar filters, etc. In some embodiments, the high pass filter 707 and the low pass filter 709 can implement two different types of filters.

The high pass filter 707 can receive the raw gyroscope signal, attenuate frequency components below the first cutoff frequency, and generate a high-passed gyroscope signal that includes frequency components above the first cutoff frequency, including components of the noise that are above the first cutoff frequency. In some embodiments, the first cutoff frequency can be at about 1 Hz, although various other values or ranges can be used as discussed herein.

The low pass filter 709 can receive the high-passed gyroscope signal, attenuate frequency components above the second cutoff frequency, and generate one or more low-passed (e.g., equivalently bandpassed) gyroscope signals, which can include frequency components of the raw gyroscope signal that are within a bandpass range (such as from the first cutoff frequency to the second cutoff frequency). In some embodiments, the second cutoff frequency can be a frequency that is slightly below a resonance frequency of the liquid lens 723. For example, the cutoff frequency can be at about 25-30 Hz if the resonance frequency is about 30 Hz. As another example, the cutoff frequency can be at about 30-35 Hz, if the resonance frequency is about 35 Hz. The cutoff frequency can be higher or equal to the resonance frequency. The cutoff frequency can be about 75%, about 80%, about 85%, about 90%, about 95%, about 100%, about 105%, about 110%, about 115%, about 120%, or about 125% of the resonance frequency, or any values therebetween, or any ranges bounded by any combination of these values, although other values could also be used in some cases. In some embodiments, the low pass filter 709 can be operated before the high pass filter 707. In FIG. 7A, blocks 707 and 709 can be switched, or combined into a single operation.

The controller 206 can determine control signals based at least in part on the gyroscope signals (e.g., the low passed/bandpassed gyroscope signals). In some cases, the controller 206 can determine the control signals based on raw gyroscope signals that are unfiltered, at least in a frequency range (e.g., in the bandpassed frequency). In some cases, the controller 206 can determine a tilt amount (e.g., a target optical tilt amount and/or a physical tilt amount) and/or a tilt direction based at least in part on the gyroscope data. The tilt amount and/or direction can be used to determine control signals for driving the liquid lens to implement the tilt, which can at least partially compensate for motion measured by the gyroscope 703. The controller 206 can use other inputs as well to determine the control output signal(s), such as a target optical power, a target focal length, a target focal direction, etc. The controller 206 can use one or more lookup tables to determine the control signals based on one or more inputs (e.g., including the gyroscope signals). In some embodiments, the controller 206 can use a formula, algorithm, equation, or other suitable technique to determine control signals based on the one or more inputs (e.g., including the gyroscope signals). In some embodiments, the controller 206 can use a feed forward control system, such as based on the gyroscope signals. In some embodiments, the controller can implement a feedback system, in addition, or instead of a feedforward system. For example, gyroscope signals can be used in determining a target fluid interface position (e.g., as a feed forward control component) and the system can monitor the fluid interface position and adjust the control signals to move the fluid interface towards the target position (e.g., as a feedback control component). The controller 206 can generate one or more control output signals to be provided to a driver 721 to cause the driver 721 to apply one or more voltage signals to the electrodes 722 in the liquid lens, which can affect the position of the liquids 723 in the liquid lens.

In some embodiments, the liquid lens can have a response rate that is slower than the rate at which the controller 206 outputs (e.g., updates) the control signals. For example, the liquids in the liquid lens 723 can have a surface wave response that is slower than the frequency of the controller. The surface wave response can indicate an interfacial surface tension stiffness and a response time. For example, the surface wave response rate can be about 250 Hz, about 275 Hz, about 300 Hz, about 325 Hz, about 350 Hz, about 380 Hz, about 400 Hz, about 425 Hz, about 450 Hz, about 475 Hz, about 500 Hz, or any values therebetween, or any ranges bounded by any of these values, although other frequencies can apply, such as depending on the size of the liquid lens, the fluids used, and other parameters of the liquid lens. The surface wave response rate can depend on the surface tension between the fluids. The controller 206 can update the control output signals (and/or the gyroscope can update the gyroscope signals) at a frequency faster than the surface wave response rate of the liquids 723 in the liquid lens, or about 2 times faster, about 5 times faster, about 10 times faster, about 15 times faster, about 20 times faster, about 25 times faster, about 30 times faster, about 35 times faster, about 40 times faster, about 45 times faster, about 50 times faster, about 60 times faster, about 70 times faster, about 80 times faster, about 90 times faster, about 100 times faster than the surface wave response rate, or any values therebetween, or any ranges bounded by any of these values, although other embodiments are also possible.

The liquids 723 in the liquid lens can have a response frequency (e.g., a resonance frequency and/or a natural frequency), such as of about 15 Hz, about 20 Hz, about 25 Hz, about 30 Hz, about 35 Hz, about 40 Hz, about 45 Hz, about 50 Hz, about 55 Hz, about 60 Hz, or any values therebetween, or any ranges bounded by any combination of these values, although other values could be used, such as depending on the liquid lens size, the fluids used, and other liquid lens parameters. The resonance frequency can depend on the surface tension of the interface between the fluids and the geometry of the liquid lens cavity. The controller 206 can update the control output signals (and/or the gyroscope can update the gyroscope signals) at a frequency faster than the response frequency of the liquid lens, or about 5 times faster, about 10 times faster, about 15 times faster, about 20 times faster, about 25 times faster, about 30 times faster, about 35 times faster, about 40 times faster, about 45 times faster, about 50 times faster, about 60 times faster, about 70 times faster, about 80 times faster, about 90 times faster, about 100 times faster, about 125 times faster, about 150 times faster, about 175 times faster, about 200 times faster, about 250 times faster, about 300 times fasters, about 350 times faster, about 400 times faster, about 450 times faster, about 500 times faster, about 550 times faster, about 600 times faster, about 650 times faster, about 700 times faster, about 750 times faster, about 800 times faster, about 850 times faster, about 900 times faster, about 950 times faster, about 1000 times faster than the response frequency, or any values therebetween, or any ranges bounded by any of these values, although other embodiments are also possible. Because the liquid lens response rate is slower than the gyroscope data rate, and/or slower than the control signal rate or driver signal rate, the liquid lens can operate as a filter, which can effectively smooth out the gyroscope noise. Although various embodiments are disclosed herein as relating to liquid lenses and camera systems that use liquid lenses, various other types of variable focus lenses, or other variable optical elements can be used. For example, a solid lens can be movable using an actuator (e.g., a voice coil motor or other suitable device), or a volume of fluid can be changed in a reservoir, or a refractive index of a material can be changed, based at least in part on gyroscope signals to implement an optical image stabilization (OIS) system. These systems can also effectively filter fast gyroscope signals due to a response rate that is slower than the gyroscope and/or slower than the controller.

Figure 7B:
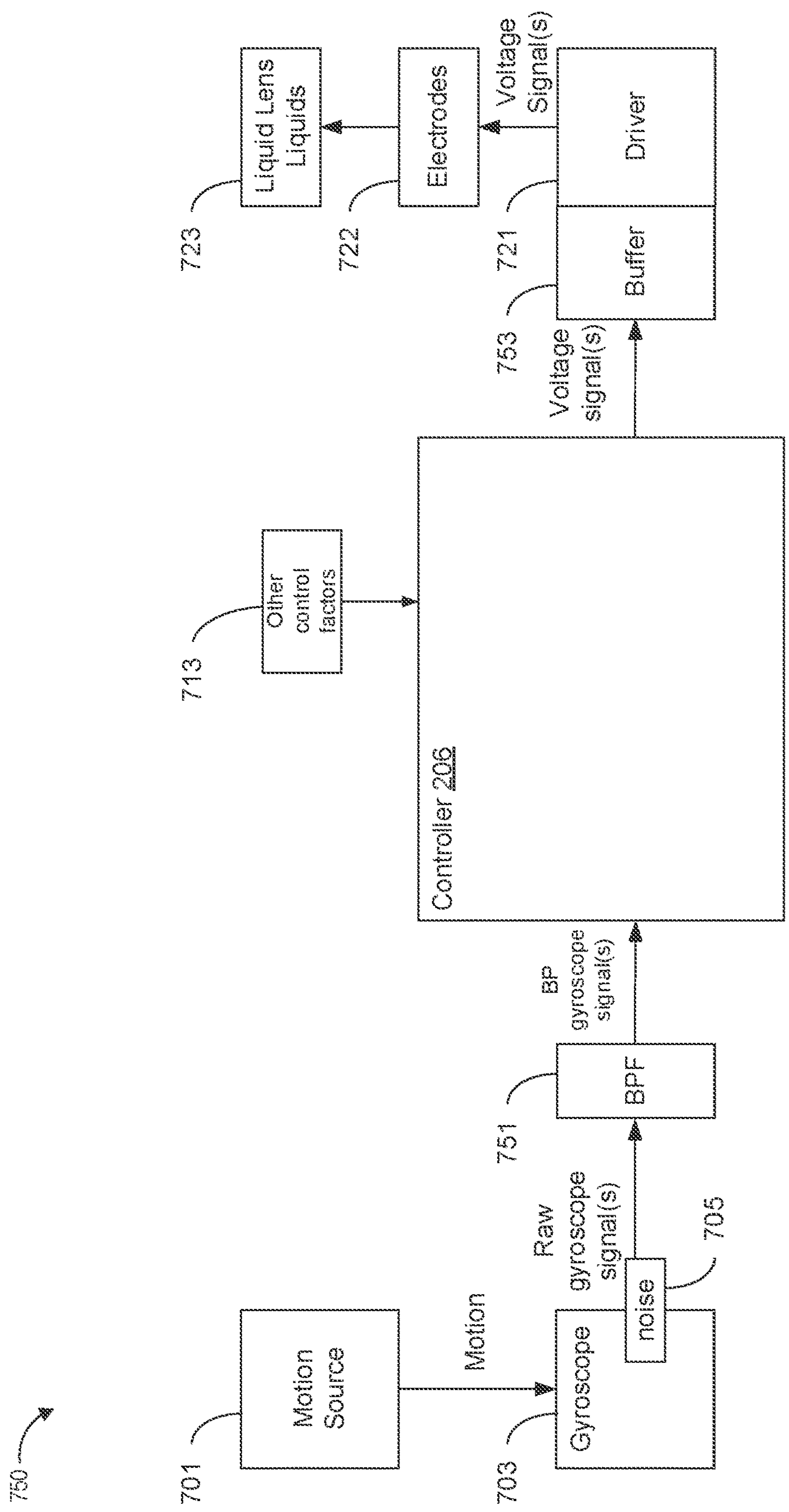
FIG. 7B shows a block diagram of another example control system.

FIG. 7B shows a block diagram of another example control system 750. The control system 750 can include features that can be the same as, or similar to, features of the system 700, or any other system disclosed herein. The block diagram includes a motion source 701, a gyroscope 703, a noise source 705, a driver 721, electrodes 722, liquids 723 in a liquid lens, and a controller 206 (such as described with respect to FIG. 5). Various control approaches can be used, as discussed herein, such as using one or more lookup tables to determine control signals.

The system 750 can include a bandpass filter 751. Components of the example control system 750 can operate similarly to components previously described with respect to the example control system 700 of FIG. 7A. For example, the bandpass filter 751 can operate similarly to the combination of the high pass filter 707 and the low pass filter 709 as discussed with respect to the example control system 700 of FIG. 7A. In some embodiments, the bandpass filter 751 can be implemented in hardware or in software. The bandpass filter 751, high pass filter 707, and/or low pass filter 709 can be implemented as a passive filter or as an active filter. The passive filter can omit active components such as switches and amplifiers, and this can help to reduce or prevent phase delay in the filtered gyroscope signals. The bandpass filter 751 can be configured to receive the raw gyroscope signals 705 from the gyroscope 703, including any noise components. The bandpass filter 751 can be configured to attenuate components of the raw gyroscope signal below a first cutoff threshold, attenuate components of the raw gyroscope signal above a second cutoff threshold, and pass components of the raw gyroscope signal (including noise components) that are within a bandpass range. The bandpass filter 751 can process the gyroscope signal without creating phase delay or with only very small phase delays, as discussed herein. The bandpass filter 751 can generate one or more bandpassed gyroscope signals as an output. In some embodiments, the high pass filter 707 and/or the low pass filter 709 can be implemented using hardware, similar to the discussion of the bandpass filter 751. In some cases, the bandpass filter 751 can be implemented digitally, using software, using the controller 206, etc.

The controller 206 can determine control signals based at least in part on the gyroscope signal(s), similar to other embodiments disclosed herein. For example, the bandpassed gyroscope signals can be used for one or more lookup tables, control logic, algorithms, etc. Other control signals generated by block 713 can be used. The controller 206 can generate one or more control output signals.

Figure 7C:
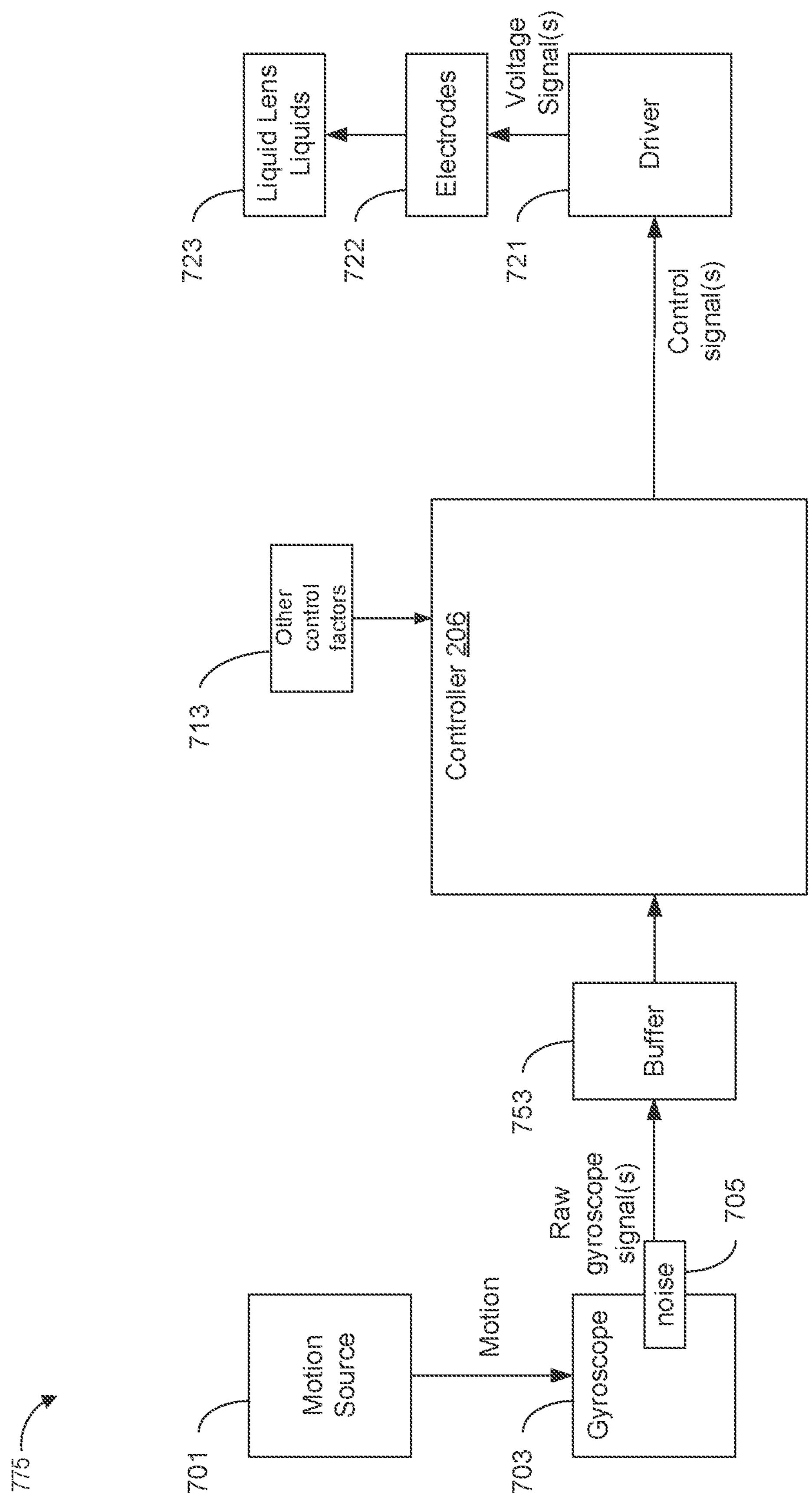
FIG. 7C shows a block diagram of another example control system.

FIG. 7C shows a block diagram of another example control system 775. The control system 775 can have features that are the same as, or similar to, the features disclosed in connection with systems 700 and/or 750, or the other embodiments disclosed herein. In some embodiments, the controller 206 can operate at a frequency that is about as fast as or at least as fast as the gyroscope 703. In some embodiments, the raw gyroscope signal can be a digital signal that is updated at a rate of about 2 kHz, about 5 kHz, about 7 kHz, about 8 kHz, about 10 kHz, about 15 kHz, about 20 kHz, about 25 kHz, or faster, or any values therebetween, or any ranges bounded by any of these values, although other values could also be used. The controller 206 can be configured to receive inputs (e.g., from the gyroscope and/or other sources) at a rate, and/or can be configured to update or change the control output signals at a rate, and the rate can be about 2 kHz, about 5 kHz, about 6 kHz, about 7 kHz, about 8 kHz, about 9 kHz, about 10 kHz, about 12 kHz, about 15 kHz, about 20 kHz, about 25 kHz, or faster, or any values therebetween, or any ranges bounded by these values, although other values could be used. In some embodiments, the gyroscope signals or data can be provided to a buffer 753. The buffer 753 can operate as an average accumulation buffer that determines an average of accumulated gyroscope signals or data. The buffer 753 can then provide the average value of the accumulated gyroscope signals or data to the controller 206, e.g., at a lower frequency than the rate of the gyroscope 703. When the driver receives the update, the driver can apply a voltage signal to the electrodes of the liquid lens to impose an electric force on the liquids 723 of the liquid lens to achieve or maintain a desired focus in the presence of motion. In some embodiments, the speed of the driver 721 can be as fast as or about as fast as the controller 206 (e.g., in the kHz range or faster). In some cases, the buffer 753 can store or accumulate raw, unfiltered gyroscope signals or data. In some cases, the filtering (e.g., high pass filtering, low pass filtering, and/or bandpass filtering) can be performed before the buffer 753 (e.g., using passive filtering, as discussed herein) and the buffer 753 can store and/or accumulate processed (e.g., filtered) gyroscope signals or data. In some cases, the accumulated gyroscope signals or data can be provided to a high pass filter, low pass filter, and/or bandpass filter (e.g., implemented using a digital controller 206). In some cases, the buffer 753 can be implemented digitally, for example as part of the controller 206. In some embodiments, the gyroscope data and resulting controls signals and voltages can be fed to the controller 206, driver 721, and/or liquid lens 10 as fast as they can receive them. One or more buffers can be implemented to hold data, signals, voltages, etc. until they are ready to be received. For example, a buffer 753 can buffer signals sent from the controller 206 to the driver 721, in some cases.

In some embodiments, a liquid lens system for providing gyroscope signals with reduced phase delay comprises a liquid lens comprising a chamber, a first fluid contained in the chamber, a second fluid contained in the chamber, wherein the first fluid and the second fluid are substantially immiscible to form a fluid interface between the first fluid and the second fluid, one or more insulated electrodes that are insulated from the first and second fluids, and one or more electrodes in electrical communication with the first fluid, wherein the liquid lens is configured such that a position of the fluid interface is based at least in part on voltages applied between a plurality of insulated electrodes and the one or more electrodes in electrical communication with the first fluid. In some embodiments, the system comprises a gyroscope configured to generate a raw gyroscope signal to represent a motion of the gyroscope and a digital controller operable to receive the raw gyroscope signal, filter the raw gyroscope signal to generate a filtered gyroscope signal having substantially the same phase as the raw gyroscope signal, and generate a control output signal based at least in part on the filtered gyroscope signal, wherein the voltages are determined based at least in part on the control output signal. In some embodiments, the digital controller is configured to filter the raw gyroscope signal using a bandpass filter that is configured to attenuate signals outside of a bandpass frequency range and to pass frequencies within the bandpass frequency range. Additionally, or alternatively, the raw gyroscope signal includes noise, and the filtered gyroscope signal includes components of the noise that are within the bandpass frequency range. Additionally, or alternatively, the digital controller is configured to filter the raw gyroscope signal using at least a passive low pass filter of a first filter type and a passive high pass filter of a second filter type that is different from the first filter type. Additionally, or alternatively, the digital controller is configured to filter the raw gyroscope signal using at least a passive low pass filter configured to attenuate frequencies above a first cutoff frequency and pass frequencies below the first cutoff frequency, wherein a resonant frequency of the liquid lens is higher than the first cutoff frequency, and a passive high pass filter configured to attenuate frequencies below a second cutoff frequency, wherein the second cutoff frequency is lower than the first cutoff frequency. Additionally, or alternatively, the digital controller is configured to generate the control output signal using a feedforward control system. Additionally, or alternatively, the gyroscope is configured to update the raw gyroscope signal at a first frequency, and the digital controller is configured to receive the raw gyroscope signal and to generate the control output signal at a second frequency that is faster than a surface wave response frequency of the liquid lens. Additionally, or alternatively, the first frequency is at least about 5 kHz, and the second frequency is at least as fast as the first frequency.

In some embodiments, a control system for a liquid lens system comprises a gyroscope configured to generate raw gyroscope signals that include noise. A digital controller can be operable to receive the raw gyroscope signals that include noise, filter the raw gyroscope signals to generate a filtered gyroscope signal that includes at least some of the noise, and generate a control output signal based at least in part on the filtered gyroscope signal that includes at least some of the noise. A driver can be configured to receive the control output signal and to apply a voltage signal to one or more electrodes in a liquid lens. In some embodiments, the liquid lens comprises a chamber, a first fluid contained in the chamber, and a second fluid contained in the chamber, wherein the first fluid and the second fluid are substantially immiscible to form a fluid interface between the first fluid and the second fluid, and wherein the liquid lens is configured such that a position of the fluid interface is based at least in part on voltage signals applied to the liquid lens.

In some embodiments, a control method to compensate for motion in a liquid lens comprises generating a raw gyroscope signal from a gyroscope, the raw gyroscope signal including noise that does not represent motion of the gyroscope, transmitting the raw gyroscope signal from the gyroscope to a digital controller, filtering the raw gyroscope signal to generate a filtered gyroscope signal that includes at least some of the noise, wherein the filtered gyroscope signal has substantially the same phase as the raw gyroscope signal, and generating a control output signal based at least in part on the filtered gyroscope signal, and driving, based at least in part on the control output signal, a voltage signal to one or more electrodes in a liquid lens. In some embodiments, the liquid lens comprises a chamber, a first fluid contained in the chamber, and a second fluid contained in the chamber, wherein the first fluid and the second fluid are substantially immiscible to form a fluid interface between the first fluid and the second fluid. In some embodiments, the control method comprises changing or maintaining a position of the fluid interface that is responsive to the voltage signal applied to the one or more electrodes.

Additional Details

In the disclosure provided above, apparatus, systems, and methods for control of a lens are described in connection with particular example embodiments. It will be understood, however, that the principles and advantages of the embodiments can be used for any other applicable systems, apparatus, or methods. While some of the disclosed embodiments may be described with reference to analog, digital, or mixed circuitry, in different embodiments, the principles and advantages discussed herein can be implemented for different parts as analog, digital, or mixed circuitry. In some figures, four electrodes (e.g., insulated electrodes) are shown. The principles and advantages discussed herein can be applied to embodiments with more than four electrodes or fewer than four electrodes.

The principles and advantages described herein can be implemented in various apparatuses. Examples of such apparatuses can include, but are not limited to, consumer electronic products, parts of the consumer electronic products, electronic test equipment, etc. The principles and advantages described herein relate to lenses. Examples products with lenses can include a mobile phone (for example, a smart phone), healthcare monitoring devices, vehicular electronics systems such as automotive electronics systems, webcams, a television, a computer monitor, a computer, a hand-held computer, a tablet computer, a laptop computer, a personal digital assistant (PDA), a refrigerator, a DVD player, a CD player, a digital video recorder (DVR), a camcorder, a camera, a digital camera, a copier, a facsimile machine, a scanner, a multi-functional peripheral device, a wrist watch, a clock, etc. Further, apparatuses can include unfinished products.

In some embodiments, the methods, techniques, microprocessors, and/or controllers described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. The instructions can reside in RAM memory, flash memory, ROM memory, EPROM memory, EEPROM memory, registers, hard disk, a removable disk, a CD-ROM, or any other form of a non-transitory computer-readable storage medium. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

The processor(s) and/or controller(s) described herein can be coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

The processor(s) and/or controller(s) described herein may implement the techniques described herein using customized hard-wired logic, one or more ASICs or FPGAs, firmware and/or program logic which causes microprocessors and/or controllers to be a special-purpose machine. According to one embodiment, parts of the techniques disclosed herein are performed by a processor (e.g., a microprocessor) and/or other controller elementss in response to executing one or more sequences instructions contained in a memory. Such instructions may be read into the memory from another storage medium, such as storage device. Execution of the sequences of instructions contained in the memory causes the processor or controller to perform the process steps described herein. In alternative embodiments, hard-wired circuitry may be used in place of or in combination with software instructions.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry.

Unless the context clearly requires otherwise, throughout the description and the claims, the words "comprise," "comprising," "include," "including," and the like are to be construed in an inclusive sense, as opposed to an exclusive or exhaustive sense; that is to say, in the sense of "including, but not limited to." The words "coupled" or "connected," as generally used herein, refer to two or more elements that can be either directly connected, or connected by way of one or more intermediate elements. Additionally, the words "herein," "above," "below," and words of similar import, when used in this application, shall refer to this application as a whole and not to any particular portions of this application. Where the context permits, words in the Detailed Description using the singular or plural number can also include the plural or singular number, respectively. The words "or" in reference to a list of two or more items, is intended to cover all of the following interpretations of the word: any of the items in the list, all of the items in the list, and any combination of the items in the list. All numerical values provided herein are intended to include similar values (e.g., within a range of measurement error).

Although this disclosure contains certain embodiments and examples, it will be understood by those skilled in the art that the scope extends beyond the specifically disclosed embodiments to other alternative embodiments and/or uses and obvious modifications and equivalents thereof. In addition, while several variations of the embodiments have been shown and described in detail, other modifications will be readily apparent to those of skill in the art based upon this disclosure. It is also contemplated that various combinations or sub-combinations of the specific features and aspects of the embodiments may be made and still fall within the scope of this disclosure. It should be understood that various features and aspects of the disclosed embodiments can be combined with, or substituted for, one another in order to form varying modes of the embodiments. Any methods disclosed herein need not be performed in the order recited. Thus, it is intended that the scope should not be limited by the particular embodiments described above.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. Any headings used herein are for the convenience of the reader only and are not meant to limit the scope.

Further, while the devices, systems, and methods described herein may be susceptible to various modifications and alternative forms, specific examples thereof have been shown in the drawings and are herein described in detail. It should be understood, however, that the invention is not to be limited to the particular forms or methods disclosed, but, to the contrary, the invention is to cover all modifications, equivalents, and alternatives falling within the spirit and scope of the various implementations described. Further, the disclosure herein of any particular feature, aspect, method, property, characteristic, quality, attribute, element, or the like in connection with an implementation or embodiment can be used in all other implementations or embodiments set forth herein. Any methods disclosed herein need not be performed in the order recited. The methods disclosed herein may include certain actions taken by a practitioner; however, the methods can also include any third-party instruction of those actions, either expressly or by implication.

The ranges disclosed herein also encompass any and all overlap, sub-ranges, and combinations thereof. Language such as "up to," "at least," "greater than," "less than," "between," and the like includes the number recited. Numbers preceded by a term such as "about" or "approximately" include the recited numbers and should be interpreted based on the circumstances (e.g., as accurate as reasonably possible under the circumstances, for example ±1%, ±3%, ±5%, ±10%, ±15%, etc.). For example, "about 3.5 mm" includes "3.5 mm." Recitation of numbers and/or values herein should be understood to disclose both the values or numbers as well as "about" or "approximately" those values or numbers, even where the terms "about" or "approximately" are not recited. For example, recitation of "3.5 mm" includes "about 3.5 mm." Phrases preceded by a term such as "substantially" include the recited phrase and should be interpreted based on the circumstances (e.g., as much as reasonably possible under the circumstances). For example, "substantially constant" includes "constant." Unless stated otherwise, all measurements are at standard conditions including ambient temperature and pressure.

What is claimed is:

1. A liquid lens system comprising:
a liquid lens comprising:
a chamber;
a first fluid contained in the chamber;
a second fluid contained in the chamber, wherein the first fluid and the second fluid are substantially immiscible to form a fluid interface between the first fluid and the second fluid;
one or more insulated electrodes that are insulated from the first and second fluids; and
one or more electrodes in electrical communication with the first fluid, wherein a position of the fluid interface is based at least in part on voltages applied between the one or more insulated electrodes and the one or more electrodes in electrical communication with the first fluid;
wherein the liquid lens has a response frequency;
a gyroscope configured to produce gyroscope signals at a gyroscope frequency that is faster than the response frequency of the liquid lens, wherein the gyroscope signals are representative of vibration, and wherein the gyroscope signals comprise noise; and
a controller configured to:
apply a low pass filter to attenuate gyroscope signals above an upper frequency threshold and a high pass filter to attenuate gyroscope signals below a lower frequency threshold to produce processed gyroscope signals having a phase delay of no more than 20 degrees, wherein gyroscope signals between the upper frequency threshold and the lower frequency threshold are unfiltered; and
produce liquid lens driver voltage signals based at least in part on the unfiltered gyroscope signals between the upper frequency threshold and the lower frequency threshold at a driver frequency that is faster than the response frequency of the liquid lens.

2. The liquid lens system of claim 1, wherein a band pass filter comprises the high pass filter and the low pass filter.

3. The liquid lens system of claim 1, further comprising an accumulation buffer that receives the gyroscope signals and provides an accumulation of a plurality of the gyroscope signals to the controller.

4. The liquid lens system of claim 1, wherein the driver frequency of the driver voltage signals produced based at least in part on the unfiltered gyroscope signals is at least about 5 times faster than the response frequency of the liquid lens.

5. The liquid lens system of claim 1, wherein the driver frequency of the driver voltage signals produced based at least in part on the unfiltered gyroscope signals is at least about 50 times faster than the response frequency of the liquid lens.

6. The liquid lens system of claim 1, wherein the driver frequency of the driver voltage signals produced based at least in part on the unfiltered gyroscope signals is not more than about 1,000 times faster than the response frequency of the liquid lens.

7. The liquid lens system of claim 1, wherein the unfiltered gyroscope signals used to produce the driver voltage signals have a noise power spectral density of at least about 4 mdps per square root Hz.

8. The liquid lens system of claim 1, wherein the liquid lens operates as a filter for the gyroscope signals.

9. A method of driving a liquid lens having a fluid interface, the method comprising:
obtaining a first gyroscope signal at a first time;
determining a first control signal configured to position the fluid interface of the liquid lens at a first position based at least in part on the first gyroscope signal;
applying the first control signal to the liquid lens to drive the fluid interface towards the first position;
obtaining a second gyroscope signal at a second time;
determining a second control signal configured to position the fluid interface of the liquid lens at a second position based at least in part on the second gyroscope signal; and
applying the second control signal to the liquid lens before the fluid interface has reached the first position to interrupt the motion of the fluid interface towards the first position and to drive the fluid interface towards the second position;
wherein the liquid lens has a response time that is longer than a time between obtaining the first gyroscope signal and obtaining the second gyroscope signal, such that the liquid lens operates as a filter on the gyroscope signals.

10. The method of claim 9, further comprising applying a low pass filter or a high pass filter to the gyroscope signals.

11. The method of claim 9, wherein the liquid lens response time is at least 5 times longer than the time between the obtaining the first gyroscope signal and obtaining the second gyroscope signal.

12. The method of claim 9, wherein the liquid lens response time is at least 25 times longer than the time between the obtaining the first gyroscope signal and obtaining the second gyroscope signal.

13. The method of claim 9, wherein the liquid lens response time is at least 50 times longer than the time between the obtaining the first gyroscope signal and obtaining the second gyroscope signal.

14. The method of claim 9, wherein the liquid lens response time is not more than 1,000 times longer than the time between the obtaining the first gyroscope signal and obtaining the second gyroscope signal.

15. A variable focus lens system, the system comprising:
a variable focus lens having a response frequency;
an orientation sensor configured to provide signals representative of motion or orientation thereof, wherein the orientation sensor is configured to provide the signals at a frequency that is faster than the response frequency of the variable focus lens; and
a controller configured to provide driver signals based at least in part on the signals from the orientation sensor and to deliver the driver signals to the variable focus lens at a driver frequency that is faster than the response frequency of the variable focus lens.

16. The variable focus lens system of claim 15, wherein the variable focus lens operates as a filter for the orientation sensor signals.

17. The variable focus lens system of claim 15, wherein the system is configured to apply a band pass filter to the signals from the orientation sensor, and wherein the signals in the passed band gap are substantially unfiltered.

18. The variable focus lens system of claim 15, wherein the orientation sensor comprises a gyroscope.

19. The variable focus lens system of claim 15, wherein the variable focus lens comprises a liquid lens comprising:
a chamber;

a first fluid contained in the chamber;

a second fluid contained in the chamber, wherein the first fluid and the second fluid are substantially immiscible to form a fluid interface between the first fluid and the second fluid;

one or more insulated electrodes that are insulated from the first and second fluids; and one or more electrodes in electrical communication with the first fluid, wherein the liquid lens is configured such that a position of the fluid interface is based at least in part on voltages applied between the one or more insulated electrodes and the one or more electrodes in electrical communication with the first fluid.

20. The variable focus lens system of claim 19, wherein the one or more insulated electrodes comprises four insulated electrodes positioned at four quadrants of the liquid lens.

* * * * *